UNITED STATES PATENT OFFICE.

EDWARD WILLIAM PARNELL, OF LIVERPOOL, ENGLAND, ASSIGNOR OF ONE-HALF HIS RIGHT TO JAMES SIMPSON, OF SAME PLACE.

IMPROVEMENT IN THE MANUFACTURE OF CAUSTIC ALKALIES.

Specification forming part of Letters Patent No. 203,761, dated May 14, 1878; application filed February 4, 1878.

*To all whom it may concern:*

Be it known that I, EDWARD WILLIAM PARNELL, of Liverpool, in the county of Lancaster, England, have invented an Improved Process for Manufacturing Caustic Alkalies, of which the following is a specification:

The object of the invention is to reduce the cost of producing caustic soda and potassa from their carbonates.

In the manufacture of caustic soda and potassa from their carbonates, as at present carried on, a solution of alkaline carbonate of a density seldom exceeding 1,110° specific gravity is heated and agitated in an open vessel in the presence of caustic lime. If the specific gravity of such solution is materially greater than that above mentioned, the lime and the carbonate or carbonates will not react upon each other, except to a very limited extent, at any temperature available under ordinary atmospheric pressure.

Now, my invention provides a process whereby solutions of alkaline carbonates of greater density than those above given are rendered available for the manufacture of caustic alkalies, thereby reducing the amount of material to be treated to produce a given quantity of caustic alkali, and consequently effecting a saving in fuel and space required; and the said process consists, first, in heating the alkaline carbonate or carbonates mixed with caustic lime under a pressure greater than the ordinary atmospheric pressure, so that the temperature of the mixed mass may be raised sufficiently high to cause the alkaline carbonate or carbonates and the caustic lime to react upon each other; second, in agitating the mixed alkaline carbonate or alkaline carbonates and lime during treatment in the manner above described, in order to facilitate the reaction and hasten its completion; third, in maintaining the pressure upon the products and in keeping the temperature constant after the reaction has taken place until the caustic soda or potassa, or both, have been separated from the carbonate of lime produced, in order that the reaction may not be reversed by a reduction of temperature taking place while the caustic alkali or alkalies and the carbonate of lime are in contact.

The process may be carried on in any desired description of closed vessel, in which the mixed materials to be operated upon are heated under pressure by direct contact with steam from a generator or otherwise.

Agitators of any well-known construction may be used; or the closed vessel may be caused to revolve, so as to give motion to the mixed materials. The closed vessel is fitted with draw-off cocks, feed-doors, or like appliances, whereby the materials are fed to and drawn off from the closed vessel, as desired.

Having now described my said invention, so that others will be enabled to carry my improvements into effect, I claim—

1. The process herein described for manufacturing caustic alkalies, which consists in heating carbonates of soda and potassa of a greater specific gravity or density than 1,200° with caustic lime under a pressure greater than the ordinary atmospheric pressure.

2. The process herein described for manufacturing caustic alkalies, which consists in agitating the alkaline carbonates and lime while subjected to heat and pressure, substantially as and for the purpose specified.

3. The method herein described for preventing the reversal of the reaction in the manufacture of caustic alkalies, which consists in maintaining the temperature and pressure until the alkalies and carbonate of lime have been separated, substantially as specified.

E. W. PARNELL.

Witnesses:
 JAMES JOHNSON,
 W. B. JOHNSON.